(12) United States Patent
Suwa et al.

(10) Patent No.: US 7,554,762 B2
(45) Date of Patent: Jun. 30, 2009

(54) RECORDING DISK DRIVE HAVING SHROUD

(75) Inventors: Masaya Suwa, Kawasaki (JP); Hisashi Kaneko, Kawasaki (JP); Yoshiharu Matsuda, Kawasaki (JP); Keishi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 597 days.

(21) Appl. No.: 11/213,979

(22) Filed: Aug. 30, 2005

(65) Prior Publication Data

US 2007/0002490 A1 Jan. 4, 2007

(30) Foreign Application Priority Data

Jun. 30, 2005 (JP) ............................. 2005-192272

(51) Int. Cl.
*G11B 33/14* (2006.01)

(52) U.S. Cl. .................................................. 360/97.02

(58) Field of Classification Search ........................ None
See application file for complete search history.

(56) References Cited

U.S. PATENT DOCUMENTS

| 6,898,048 | B2 * | 5/2005 | Adams et al. | 360/97.02 |
| 7,057,851 | B2 * | 6/2006 | Sun et al. | 360/97.02 |
| 7,133,249 | B2 * | 11/2006 | Miyajima | 360/97.02 |
| 7,379,266 | B1 * | 5/2008 | Ou-Yang et al. | 360/97.02 |
| 2002/0039251 | A1 | 4/2002 | Imai et al. | |
| 2002/0039253 | A1 | 4/2002 | Imai et al. | |
| 2003/0058575 | A1 | 3/2003 | Imai et al. | |
| 2003/0156352 | A1 * | 8/2003 | Voights et al. | 360/97.02 |
| 2004/0141254 | A1 | 7/2004 | Imai et al. | |
| 2004/0252405 | A1 * | 12/2004 | Sun et al. | 360/97.02 |
| 2005/0024763 | A1 * | 2/2005 | Ng et al. | 360/97.02 |
| 2005/0270692 | A1 * | 12/2005 | Adams et al. | 360/97.02 |

FOREIGN PATENT DOCUMENTS

| JP | 59-215091 | 12/1984 |
| JP | 1-144286 | 6/1989 |
| JP | 5-62451 | 3/1993 |
| JP | 2002-109858 | 4/2002 |

* cited by examiner

*Primary Examiner*—Mark Blouin
(74) *Attorney, Agent, or Firm*—Fujitsu Patent Center (57) ABSTRACT

First and second shroud surfaces are defined along an imaginary cylinder coaxial to a recording disk. A shroud plate is located between the first and second shroud surfaces. Airflow flows outward along the surface of the rotating recording disk based on the centrifugal force. The shroud plate serves to establish the continuity of the first and second shroud surfaces. The first and second shroud surfaces and the shroud plate serve to reliably suppress turbulence of the airflow. Vibration of the recording disk is suppressed than ever. An inflow opening is located in a space between the first and second shroud surfaces. The rectifier plate is located downstream of the inflow opening. The rectifier plate serves to direct the airflow flowing along the first shroud surface to the inflow opening. A larger amount of airflow can be introduced into the inflow opening. A dust catcher receives airflow of a sufficient amount.

7 Claims, 5 Drawing Sheets

RECORDING DISK DRIVE HAVING SHROUD

BACKGROUND OF THE INVENTION

1. Field of the Invention

The present invention relates to a recording disk drive such as a hard disk drive, HDD. In particular, the invention relates to a recording disk drive comprising a recording disk and a shroud surface designed to face the outward peripheral surface of the recording disk at a certain constant interval.

The terms "upstream" and "downstream" are defined based on the direction of rotation of a recording disk or magnetic recording disk in this specification.

2. Description of the Prior Art

A hard disk drive, HDD, allows disposition of a shroud at a location outside a magnetic recording disk. The shroud defines a shroud surface opposed to an outward peripheral surface of the magnetic recording disk at a certain constant interval. A land is located outside the magnetic recording disk at a position downstream of the shroud. An inflow opening is defined between the shroud and the land. A filter is located at the inflow opening at a position adjacent the magnetic recording disk.

Airflow is generated along the front and back surfaces of the magnetic recording disk during the rotation of the magnetic recording disk. The centrifugal force of the rotating magnetic recording disk causes airflow to flow into the inflow opening. Since the filter is located adjacent the magnetic recording disk, the filter forces the airflow to stay at the inflow opening. The airflow is not allowed to sufficiently flow out through the inflow opening. The filter cannot sufficiently catch dust in the airflow. Moreover, the stay of the airflow induces turbulence. The turbulence inevitably leads to vibration of the magnetic recording disk. This results in deterioration in the accuracy of positioning the head slider. The write/read operations of magnetic bit data are thus hindered.

SUMMARY OF THE INVENTION

It is accordingly an object of the present invention to provide a recording disk drive capable of improving the efficiency in catching dust in airflow and of suppressing vibration of a recording disk.

According to a first aspect of the present invention, there is provided a recording disk drive comprising: a recording disk rotating around a rotation axis; a first shroud surface extending along an imaginary cylinder defined coaxial to the recording disk, said first shroud surface opposed to the outward peripheral surface of the recording disk at a constant interval; a second shroud surface extending along an imaginary cylinder defined coaxial to the recording disk, said second shroud surface opposed to the outward peripheral surface of the recording disk at a constant interval at a position downstream of the first shroud surface; an inflow opening defined between the first and second shroud surfaces; a rectifier plate extending from the second shroud surface, said rectifier plate opposed to the surface of the recording disk at a certain interval; a shroud plate located within the inflow opening, said shroud plate opposed to the outward peripheral surface at a constant interval, said shroud plate extending along an imaginary plane perpendicular to the rotation axis of the recording disk; and a dust catcher located on an airflow passage extending from the inflow opening.

The recording disk drive of the type allows generation of airflow along the front and back surfaces of the recording disk during the rotation of the recording disk. The airflow flows outward toward the outer periphery of the recording disk based on the centrifugal force of the rotating recording disk. The first and second shroud surfaces and the shroud plate are opposed to the outward peripheral surface of the recording disk. The shroud plate serves to establish the continuity of the first and second shroud surfaces. The first and second shroud surfaces and the shroud plate serve to reliably suppress turbulence of the airflow. Vibration of the recording disk is suppressed than ever.

Moreover, the inflow opening is located in a space between the first and second shroud surfaces. The rectifier plate is located downstream of the inflow opening. The upstream end of the rectifier plate extends in the radial direction over the surface of the recording disk. The rectifier plate serves to direct the airflow flowing along the first shroud surface to the inflow opening. A larger amount of airflow can be introduced into the inflow opening. Furthermore, the shroud plate is located inside the inflow opening. The shroud plate extends along an imaginary plane perpendicular to the rotation axis of the recording disk. The airflow is allowed to efficiently flow into the airflow passage through the inflow opening. The airflow is prevented from staying at the inflow opening. The dust catcher can in this manner be exposed to a smooth airflow. The dust catcher is allowed to enjoy an efficient catch of dust out of the airflow.

According to a second aspect of the present invention, there is provided a recording disk drive comprising: a recording disk rotating around a rotation axis; a shroud surface extending along an imaginary cylinder defined coaxial to the recording disk, said shroud surface opposed to the outward peripheral surface of the recording disk at a constant interval; a head actuator designed to displace a head slider relative to the recording disk; an airflow guide surface extending from an end to an end of the shroud surface so as to define between the imaginary cylinder and the airflow guide surface itself a space for accommodating the head actuator; and a dust catcher defining protrusions protruding from the airflow guide surface.

The shroud surface serves to suppress turbulence of airflow in the recording disk drive of the type. Vibration of the recording disk is thus suppressed. Moreover, the airflow flows along the airflow guide surface. An airflow passage is in this manner established along the airflow guide surface. Moreover, since the protrusions enable enlargement of area in the dust catcher without increasing the occupied space. The dust catcher is thus allowed to achieve an efficient catch of dust.

In this case, the protrusions of the dust catcher may be terminated within the airflow passage. The airflow is thus allowed to suppress stay of airflow as much as possible inside the airflow passage. The dust catcher is allowed to reliably receive airflow of a sufficient current velocity. The dust catcher catches dust in an improved manner.

According to a third aspect of the present invention, there is provided a recording disk drive comprising: a recording disk rotating around a rotation axis; a shroud surface extending along an imaginary cylinder defined coaxial to the recording disk, said shroud surface opposed to the outward peripheral surface of the recording disk at a constant interval; a head actuator designed to displace a head slider relative to the recording disk; an airflow guide surface extending from an end to and end of the shroud surface so as to define between the imaginary cylinder and the airflow guide surface itself a space for accommodating the head actuator; an airflow passage defined along the airflow guide surface; a non-charged dust catcher located within the airflow passage, said non-charged dust catcher exposed to airflow of a first current velocity; and an electrostatic dust catcher located within the airflow passage, said electrostatic dust catcher exposed to airflow of a second current velocity smaller than the first current velocity.

The shroud surface serves to suppress turbulence of airflow in the recording disk drive of the type. Vibration of the recording disk is thus suppressed. Moreover, the non-charged dust catcher is exposed to the airflow of the first current velocity within the airflow passage. The electrostatic dust catcher is likewise exposed to the airflow of the second current velocity lower than the first current velocity. The non-charged dust catcher is capable of reliably catching dust in the airflow of the first current velocity. On the other hand, the electrostatic dust catcher is capable of efficiently catching dust in the airflow of a smaller current velocity without reducing the current velocity of the airflow. The non-charged and electrostatic dust catchers are in this manner located in a suitable manner depending on the current velocity of the airflow. A larger amount of dust can be caught in the airflow passage in an efficient manner.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
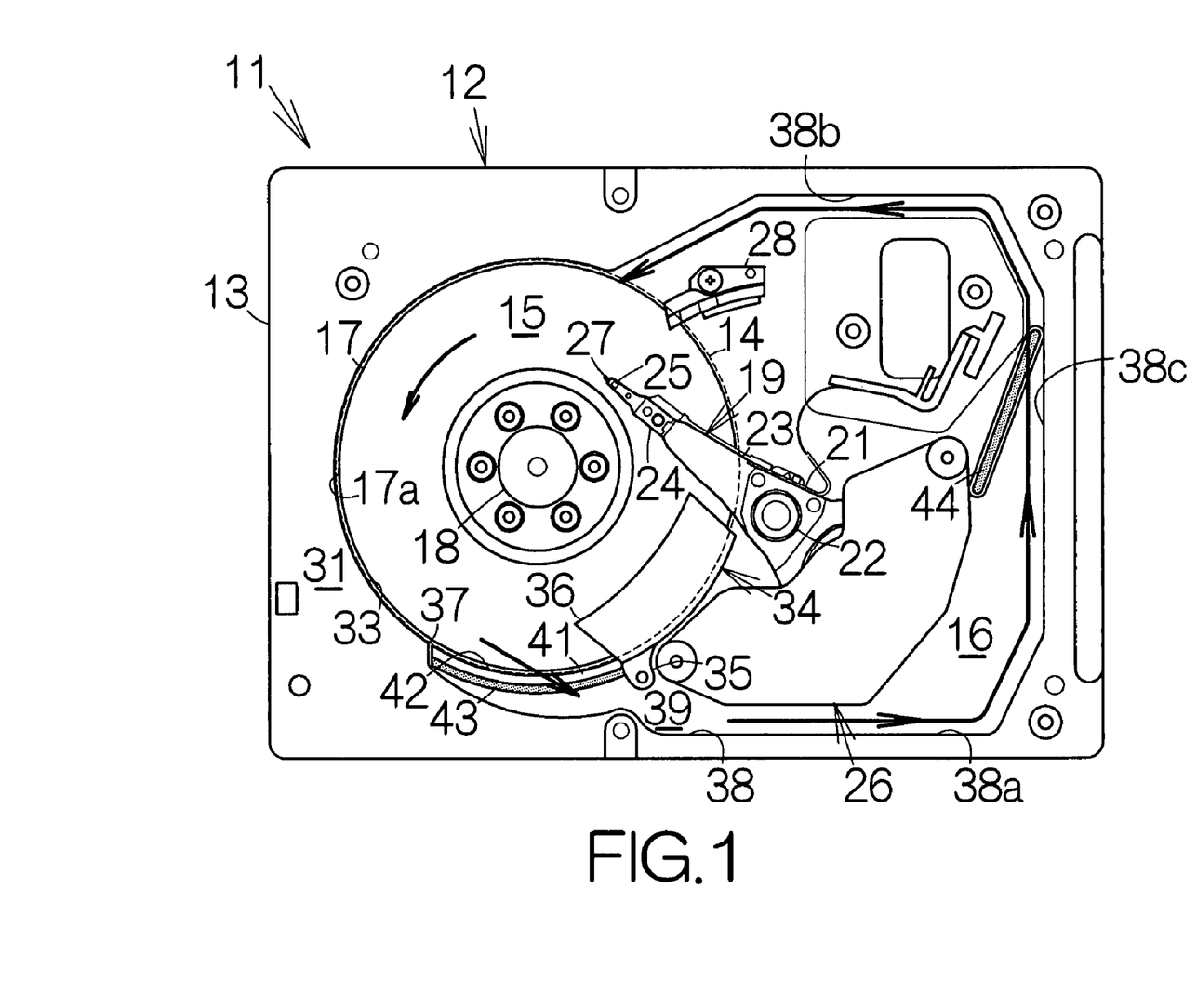
FIG. 1 is a plan view schematically illustrating the inner structure of a hard disk drive (HDD) as an example of a recording disk drive according to a first embodiment of the present invention.

FIG. 1 schematically illustrates the inner structure of a hard disk drive (HDD) 11 as an example of a disk drive or storage device according to an embodiment of the present invention. The hard disk drive 11 includes a box-shaped enclosure 12. The size of the enclosure 12 is set for a magnetic recording disk of the 3.5 inches diameter type, for example. The enclosure 12 includes a boxed-shaped base 13 defining an inner space, for example. The base 13 may be made of a metallic material such as aluminum, for example. Casting process may be employed to form the base 13. A cover, not shown, is coupled to the base 13. The cover closes the opening of the inner space within the base 13. Pressing process may be employed to form the cover out of a plate material, for example.

A disk space 15 and an actuator space 16 are defined in the base 13. The disk space 15 is contoured with an imaginary cylinder 14. The actuator space 15 located adjacent the imaginary cylinder 14. The inner space of the base 13 is in this manner divided into the disk space 15 and the actuator space 16. At least one magnetic recording disk 17 serving as a recording disk is incorporated in the disk space 15 inside the base 13. The imaginary cylinder 14 is defined coaxial to the magnetic recording disks 17. In this case, magnetic recording disks of the 2.5 inches diameter type are employed as the magnetic recording disks 17, for example. The magnetic recording disks 17 are mounted on the driving shaft of a spindle motor 18. The spindle motor 18 drives the magnetic recording disks 17 at a higher revolution speed such as 5,400 rpm, 7,200 rpm, 10,000 rpm, 15,000 rpm, or the like.

A head actuator member 19 is incorporated in the actuator space 16 inside the base 13. The head actuator member 19 includes an actuator block 21. The actuator block 21 is supported on a vertical support shaft 22 for relative rotation. Rigid actuator arms 23 are defined in the actuator block 21. The actuator arms 23 are designed to extend in a horizontal direction from the vertical support shaft 22. The actuator arms 23 of a pair are respectively related to the front and back surfaces of the magnetic recording disk 17. The actuator block 21 may be made of a metallic material such as aluminum, for example. Casting process may be employed to form the actuator block 21.

A head suspension 24 is fixed to the corresponding tip end of the individual actuator arm 23 so as to further extend in the forward direction from the actuator arm 23. A flying head slider 25 is supported on the tip or front end of the head suspension 24. The flying head slider 25 is designed to oppose a medium-opposed surface or bottom surface to the surface of the magnetic recording disk 17. As conventionally known, in case where two or more magnetic recording disks 17 are incorporated in the disk space 15 inside the base 13, a pair of the actuator arms 23 or head suspensions 24 is located in a space between the adjacent magnetic recording disks 17.

An electromagnetic transducer, not shown, is mounted on the flying head slider 25. The electromagnetic transducer may include a read element and a write element. The read element may include a giant magnetoresistive (GMR) element or a tunnel-junction magnetoresistive (TMR) element designed to discriminate magnetic bit data on the magnetic recording disk 17 by utilizing variation in the electric resistance of a spin valve film or a tunnel-junction film, for example. The write element may include a thin film magnetic head designed to write magnetic bit data into the magnetic recording disk 17 by utilizing magnetic field induced at a thin film coil pattern.

The head suspension 24 serves to urge the flying head slider 25 toward the surface of the magnetic recording disk 17. When the magnetic recording disk 17 rotates, the flying head slider 25 is allowed to receive airflow generated along the rotating magnetic recording disk 17. The airflow serves to generate positive pressure or a lift acting on the flying head slider 25. The flying head slider 25 is thus allowed to keep flying above the surface of the magnetic recording disk 17 during the rotation of the magnetic recording disk 17 at a higher stability established by the balance between the urging force of the head suspension 24 and the lift.

A power source or voice coil motor, VCM, 26 is incorporated in the actuator space 16. The voice coil motor 26 is coupled to the actuator block 21. The voice coil motor 26 serves to drive the actuator block 21 around the vertical support shaft 22. The rotation of the actuator block 21 allows the actuator arms 23 and the head suspensions 24 to swing. When the actuator arm 23 swings around the vertical support shaft 22 during the flight of the flying head slider 25, the flying head slider 25 is allowed to move in the radial direction of the magnetic recording disk 17. The electromagnetic transducer on the flying head slider 25 can thus be positioned right above a target recording track on the magnetic recording disk 17.

A load member or load tab 27 is attached to the front or tip end of the head suspension 24 so as to further extend in the forward direction from the head suspension 24. The load tab 27 is allowed to move in the radial direction of the magnetic recording disk 17 based on the swinging movement of the head actuator member 19. A ramp member 28 is located outside the magnetic recording disks 17 within the actuator space 16 on the path of movement of the load tabs 27. The ramp member 28 may be screwed on the bottom plate of the base 13, for example. The combination of the load tabs 27 and the ramp member 28 establishes a so-called load/unload mechanism. The ramp member 28 may be made of a hard plastic material, for example. Molding process may be employed to form the ramp member 28, for example.

A first shroud 31 stands upright from the bottom plate of the base 13 at a location outside the magnetic recording disks 17. The first shroud 31 defines a first shroud surface 33 extending along the aforementioned imaginary cylinder 14. The first shroud surface 33 is thus opposed to the outward peripheral surfaces 17a of the magnetic recording disks 17 at a certain constant interval. The first shroud 31 breaks at the range of the swinging movement of the head actuator member 19, namely at the boundary between the disk space 15 and the actuator space 16. The first shroud 31 may be integrated with the base 13 so as to form in a one-piece member, for example.

A second shroud 34 is also located outside the magnetic recording disks 17 at a position downstream of the first shroud 31. The terms "downstream" and "upstream" are defined based on the direction of rotation of the magnetic recording disks 17. The second shroud 34 defines a second shroud surface extending along the imaginary cylinder 14, as described later in detail. The second shroud surface is opposed to the outward peripheral surfaces 17a of the magnetic recording disks 17 at a certain constant interval. The second shroud 34 is a member separate from the base 13. The second shroud 34 includes an attachment member 35 fixed to the bottom plate of the base 13 within the actuator space 16. The attachment member 35 may be screwed into the bottom plate of the base 13, for example.

The second shroud 34 includes rectifier plates 36 extending from the second shroud surface toward the rotation axis of the magnetic recording disks 17 in parallel with the surfaces of the magnetic recording disks 17. The surface of the rectifier plate 36 is opposed to the surface of the magnetic recording disk 17 at a certain constant interval. In case where two or more magnetic recording disks 17 are incorporated in the disk space 15, a single one of the rectifier plates 36 is located commonly in a space between the adjacent magnetic recording disks 17. When airflow is generated along the surface of the magnetic recording disk 17 during the rotation of the magnetic recording disk 17, the rectifier plate 36 serves to suppress turbulence of the airflow.

An inflow opening 37 is defined at a location between the first shroud surface 33 and the second shroud surface. An airflow guide surface 38 is connected to the downstream end of the first shroud surface 33. The airflow guide surface 38 is continuous with the first shroud surface 33. The airflow guide surface 38 extends along the contour of the actuator space 16 to the upstream end of the first shroud surface 33 from the downstream end of the first shroud surface 33. In other words, the actuator space 16 is defined between the airflow guide surface 38 and the imaginary cylinder 14. An airflow passage 39 is thus defined in the actuator space 16. The airflow passage 39 thus extends along the airflow guide surface 38 from the inflow opening 37 within the actuator space 16.

First and second airflow guide surfaces 38a, 38b are defined on the airflow guide surface 38. The first airflow guide surface 38a is continuous from the downstream end of the first shroud surface 33. The second airflow guide surface 38b continuous to the upstream end of the first shroud surface 33 is opposed to the first airflow guide surface 38a. A third airflow guide surface 38c is also defined on the airflow guide surface 38 to connect the first and second airflow guide surfaces 38a, 38b. The third airflow guide surface 38c gets opposed to the imaginary cylinder 14. The airflow passage 39 in this manner extends along the first, third and second airflow guide surfaces 38a, 38c, 38b within the actuator space 16.

Shroud plates 41 are located within the inflow opening 37. The shroud plates 41 extend along parallel imaginary planes perpendicular to the rotation axis of the magnetic recording disks 17, as described later. The individual shroud plate 41 defines a third shroud surface 42 extending along the imaginary cylinder 14. The third shroud surface 42 is opposed to the outward peripheral surface 17a of the magnetic recording disk 17 at a certain constant interval. The shroud plates 41 may be integrated with the attachment member 35 of the second shroud 34. The tip ends of the shroud plates 41 are located at positions adjacent the first shroud 31. The third shroud surface 42 thus serves to establish the continuity of the first shroud surface 33 with the second shroud surface.

A non-charged dust catcher or first filter 43 is located adjacent the shroud plates 41 in the airflow passage 39. Specifically, the shroud plates 41 are located between the outward peripheral surfaces 17a of the magnetic recording disks 17 and the first filter 43. The first filter 43 may extend to completely cover the cross-section of the airflow passage 39. The first filter 43 is thus exposed to airflow flowing into the airflow passage 39 through the inflow opening 37. The first filter 43 may be made of a non-charged resin material such as PTFE (polytetrafluoroethylene), for example. The first filter 43 may be formed in a meshed fabric, for example. The first filter 43 is designed to have a fine mesh.

An electrostatic dust catcher or second filter 44 is located between the third airflow guide surface 38c and the voice coil motor 26 at a position far from the inflow opening 37. The second filter 44 extends along an imaginary plane, intersecting the third airflow guide surface 38c by a predetermined cross angle, so as to cross the airflow passage 39. The second filter 44 is thus exposed to airflow flowing in the airflow passage 39 at a position far from the inflow opening 37. The second filter 44 may be made of an electrostatic material such as electret, for example. The second filter 44 may be formed in a meshed fabric, for example. The second filter 44 is designed to have a mesh coarser than the mesh of the first filter 43. The second filter 44 catches dust with the assistance of static electricity established in the second filter 44, for example.

Figure 2:
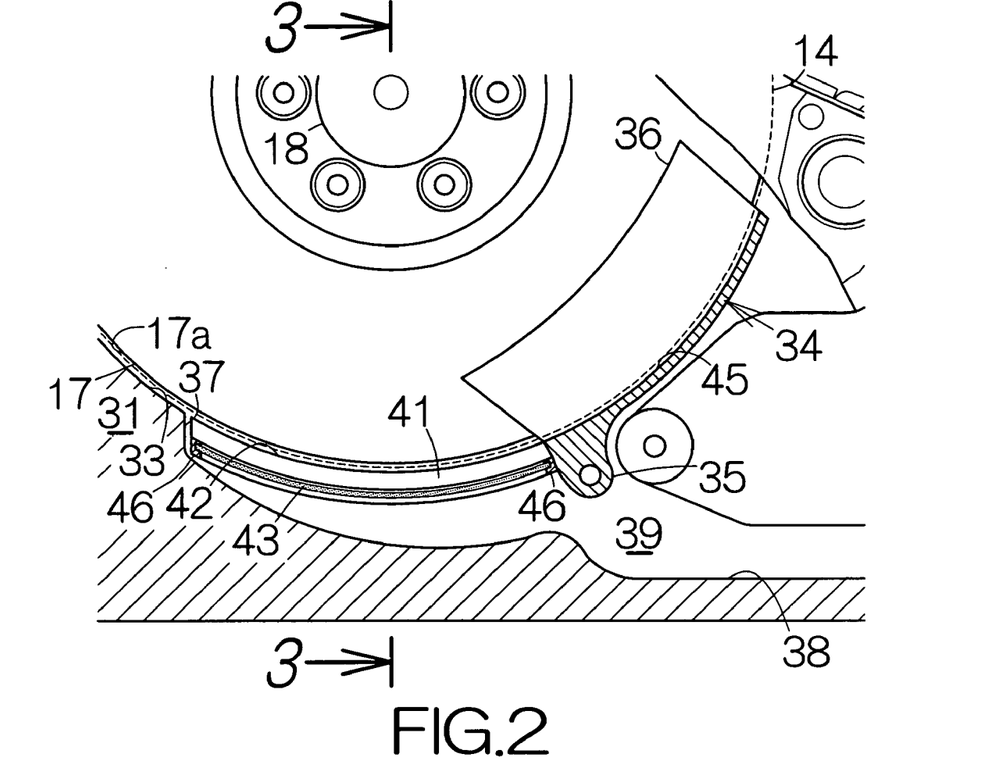
FIG. 2 is an enlarged partial sectional view schematically illustrating the structure of a second shroud, shroud plates and a first filter.

As shown in FIG. 2, the aforementioned second shroud surface 45 is defined on the second shroud 34 along the imaginary cylinder 14. The second shroud surface 45 extends on the attachment member 35 at a position between the adjacent rectifier plates 36. The second shroud surfaces 45 are thus continuous with the corresponding third shroud surfaces 42 of the shroud plates 41.

A pair of support members 46, 46 is utilized to hold the first filter 43. The support members 46 may stand upright from the bottom plate of the base 13, for example. The support members 46 may be fixed to the shroud plate 41.

Figure 3:
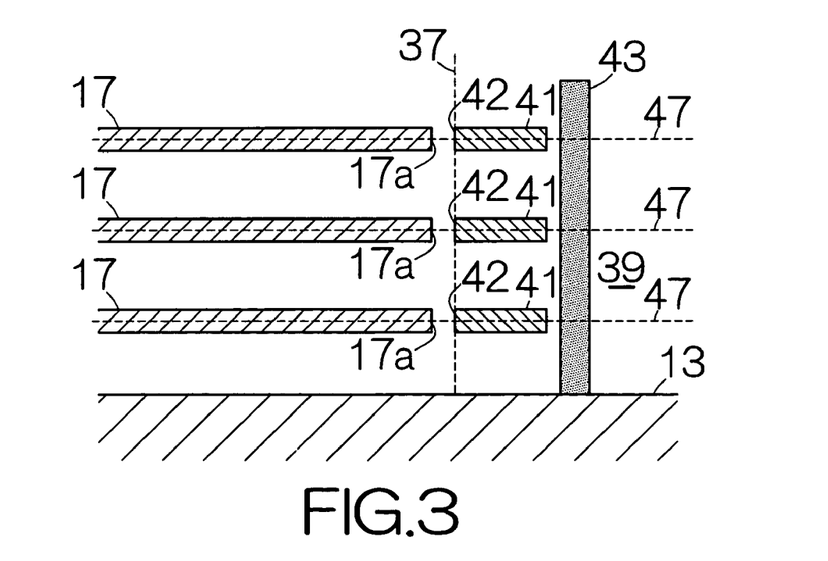
FIG. 3 is an enlarged partial sectional view taken along the line 3-3 in FIG. 2 for schematically illustrating the positional relationship of the shroud plates, the first filter and a magnetic recording disk.

Referring also to FIG. 3, the individual shroud plate 41 is related to the corresponding magnetic recording disk 17. The shroud plate 41 extends along an imaginary plane 47 perpendicular to the rotation axis of the magnetic recording disks 17.

The magnetic recording disk 17 likewise extends along the imaginary plane 47. The thickness of the shroud plate 41 corresponds to that of the magnetic recording disk 17. Accordingly, the inflow opening 37 and the airflow passage 39 are connected through a space between the adjacent shroud plates 41. When airflow is generated along the surfaces of the magnetic recording disks 17, the airflow smoothly flows into the airflow passage 39 through the inflow opening 37. Alternatively, the thickness of the shroud plate 41 may be different from that of the magnetic recording disk 17.

The hard disk drive 11 allows generation of airflow on the front and back surfaces of the rotating magnetic recording disk 17. The centrifugal force of the rotating magnetic recording disk 17 causes the airflow to flow outward toward the outer periphery of the magnetic recording disk 17. The first, second and third shroud surfaces 33, 45, 42 are opposed to the outward peripheral surface 17a of the magnetic recording disk 17 at a certain constant interval. The third shroud surface 42 serves to establish the continuity of the first and second shroud surfaces 33, 45. The first, second and third shroud surfaces 33, 45, 42 serve to reliably suppress turbulence of the airflow. Vibration of the magnetic recording disk or disks 17 is suppressed than ever.

Moreover, the inflow opening 37 is connected to the downstream end of the first shroud surface 33. The rectifier plate 36 is located downstream of the inflow opening 37. The upstream end surface of the rectifier plate 36 extends in the radial direction over the surface of the magnetic recording disk 17. The rectifier plate 36 serves to direct the airflow flowing along the first shroud surface 33 toward the inflow opening 37. A larger amount of airflow is allowed to flow into the inflow opening 37 with the assistance of the centrifugal force of the rotating magnetic recording disk 17. As described above, the thickness of the shroud plate 41 corresponds to that of the magnetic recording disk 17 on the single imaginary plane 47 at the inflow opening 37. The airflow along the front and back surfaces of the magnetic recording disk 17 thus efficiently flows into the inflow opening 37 without any hindrance of the shroud plates 41. The airflow is prevented from staying at the inflow opening 37. The first filter 43 is thus exposed to a larger amount of airflow. The first filter 43 is allowed to enjoy a higher efficiency in catching dust in the airflow.

Airflow is allowed to enjoy a first or highest current velocity at the inflow opening 37 in the airflow passage 39 since the inflow opening 37 is located nearest to the rotating magnetic recording disks 17. The first filter 43 having a fine mesh achieves a reliable catch of dust irrespective of the maximum current velocity of the airflow. On the other hand, airflow is allowed to enjoy a second current velocity lower than the first current velocity along the second and third airflow guide surfaces 38b, 38c in the airflow passage 39. The second filter 44 charged with static electricity is allowed to reliably catch dust without inducing hindrance to the flow of the airflow irrespective of a coarse mesh. The first and second filters 43, 44 are in this manner located in a suitable manner depending on the current velocity of the airflow. A larger amount of dust can be caught in the airflow passage 39 in an efficient manner.

The inventors examined the effect of the aforementioned shroud plates 41. The inventors prepared the hard disk drive 11 according to an example of the present invention. The inventors also prepared a comparative example according to a conventional hard disk drive. No shroud plates 41 were formed in the second shroud 34 in the comparative example. The flying head sliders were opposed to both the front and back surfaces of the individual magnetic recording disks in the example of the present invention and the comparative example. Magnetic bit data was read out through the electromagnetic transducers on the flying head sliders out of the magnetic recording disks during the rotation of the magnetic recording disks. Frequency characteristics of the vibration were analyzed based on the magnetic bit data read from the magnetic recording disks.

Figure 4:
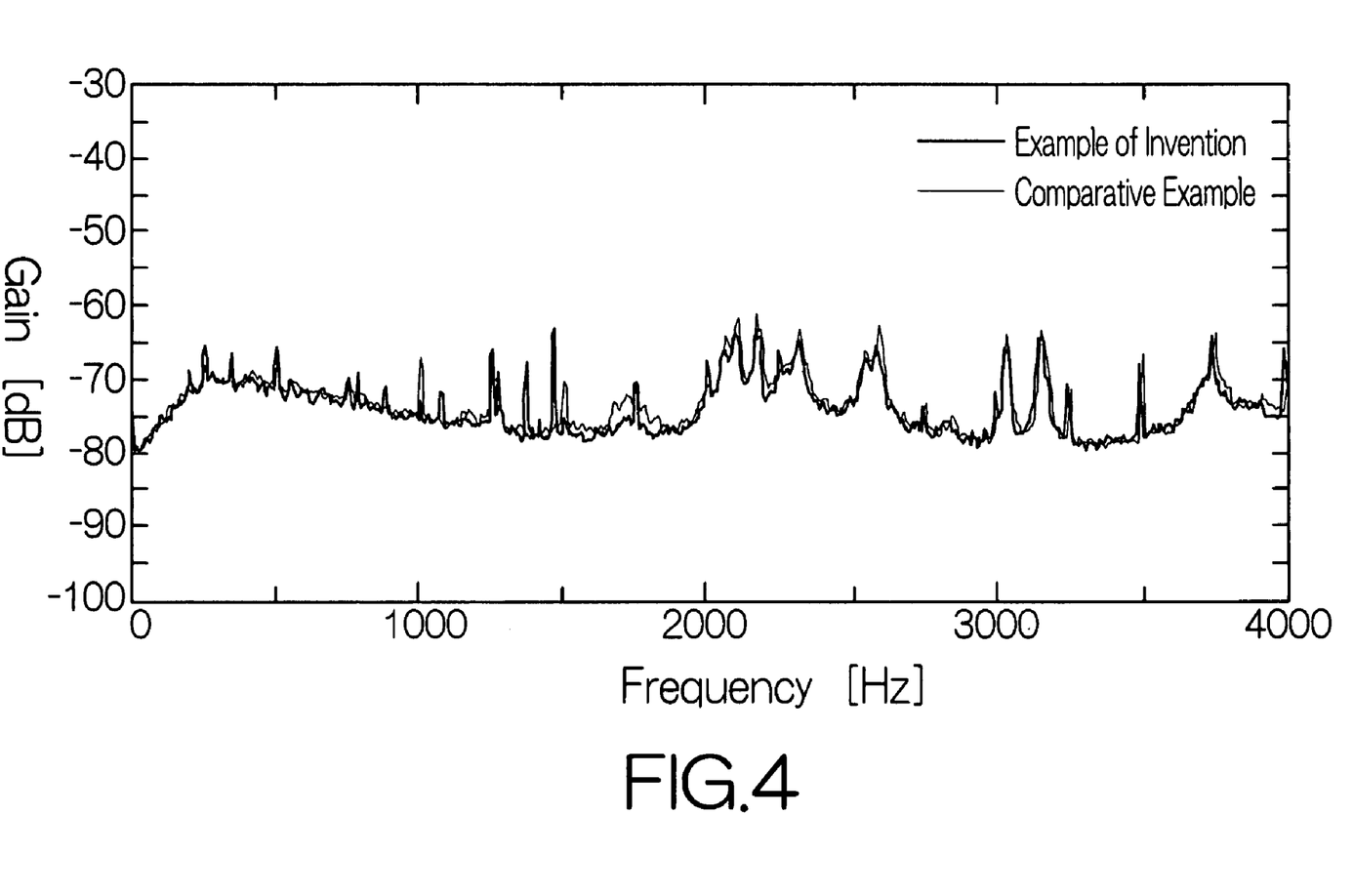
FIG. 4 is a graph showing the frequency characteristic of vibration.

FIG. 4 illustrates the frequency characteristic representative of vibration. A decrease of 2-3 [dB] was observed in the gain of the frequency for the example of the present invention as compared with the comparative example. In particular, it has been proved that a reliable decrease of the gain could be observed over the range between 2,000 [Hz] and 3,000 [Hz]. This frequency corresponds to the vibration of a magnetic recording disk. It has been confirmed that the shroud plates 41 serve to suppress the vibration of the magnetic recording disks 17 in the hard disk drive 11 according to the example of the present invention. Sway of the flying head slider 21 was suppressed relative to the magnetic recording disk 17 in the hard disk drive 11. Furthermore, it has been proved that the gain could still be suppressed over ranges below 2,000 [Hz] and above 3,000 [Hz].

Figure 5:
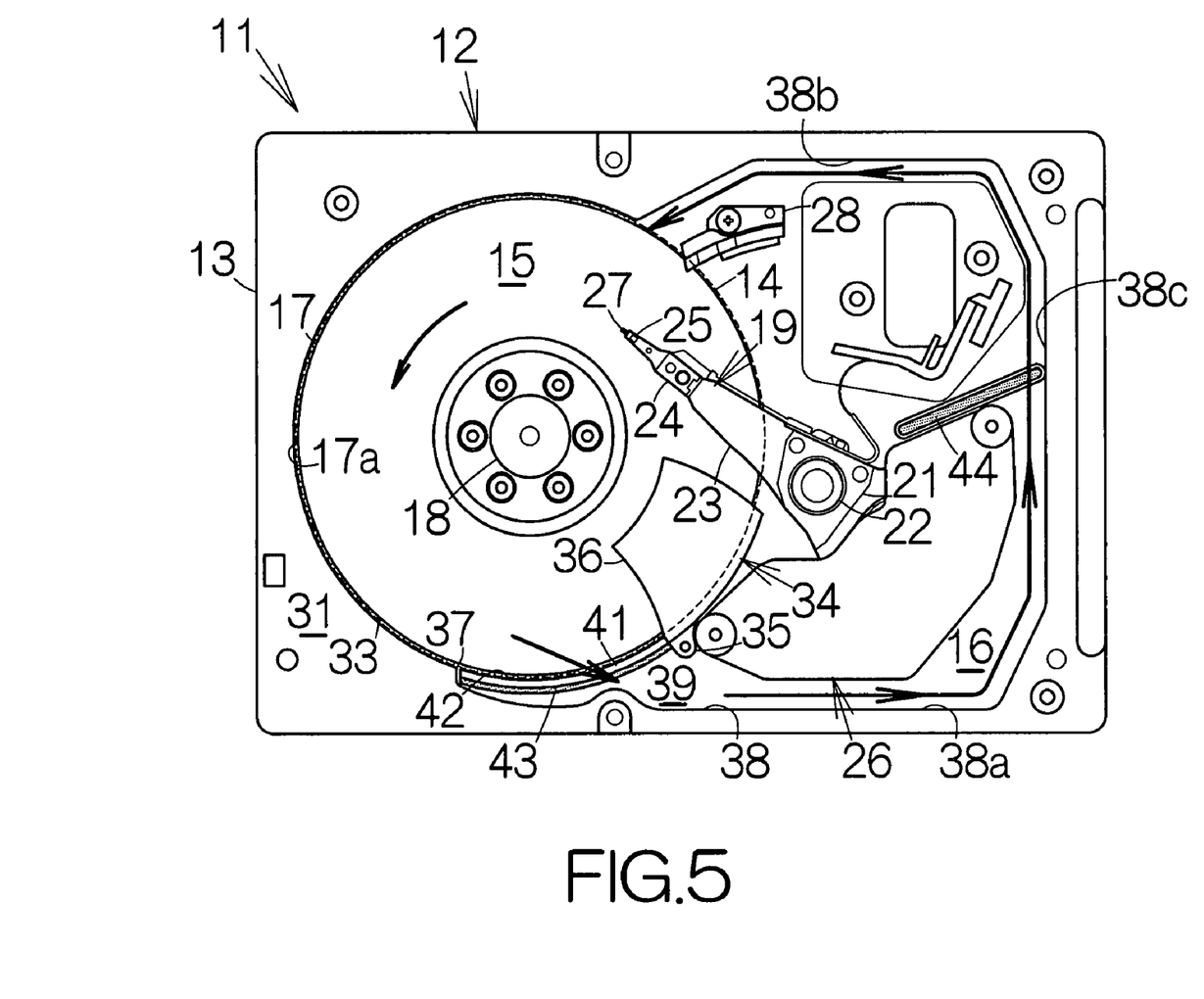
FIG. 5 is a plan view, corresponding to FIG. 1, schematically illustrating the inner structure of a hard disk drive according to a second embodiment of the present invention.

FIG. 5 schematically illustrates the inner structure of a hard disk drive 11 according to a second embodiment of the present invention. The hard disk drive 11 of the second embodiment includes the magnetic recording disks of the 3.5 inches diameter type. The aforementioned enclosure 12 is still employed in this case so as to contain the shroud plates 41, the first filter 43 and the second filter 44 in the aforementioned manner. In this case, the position of the second filter 44 may depend on the position of the voice coil motor 26, for example. Here, the second filter 44 may be located along the voice coil motor 26. Even if the volume of the actuator space 16 is decreased in response to an increase in the volume of the disk space 15, the second filter 44 can be incorporated in the actuator space 16. The actuator space 16 is efficiently utilized. Like reference numerals are attached to structure or components equivalent to those of the aforementioned first embodiment.

Figure 6:
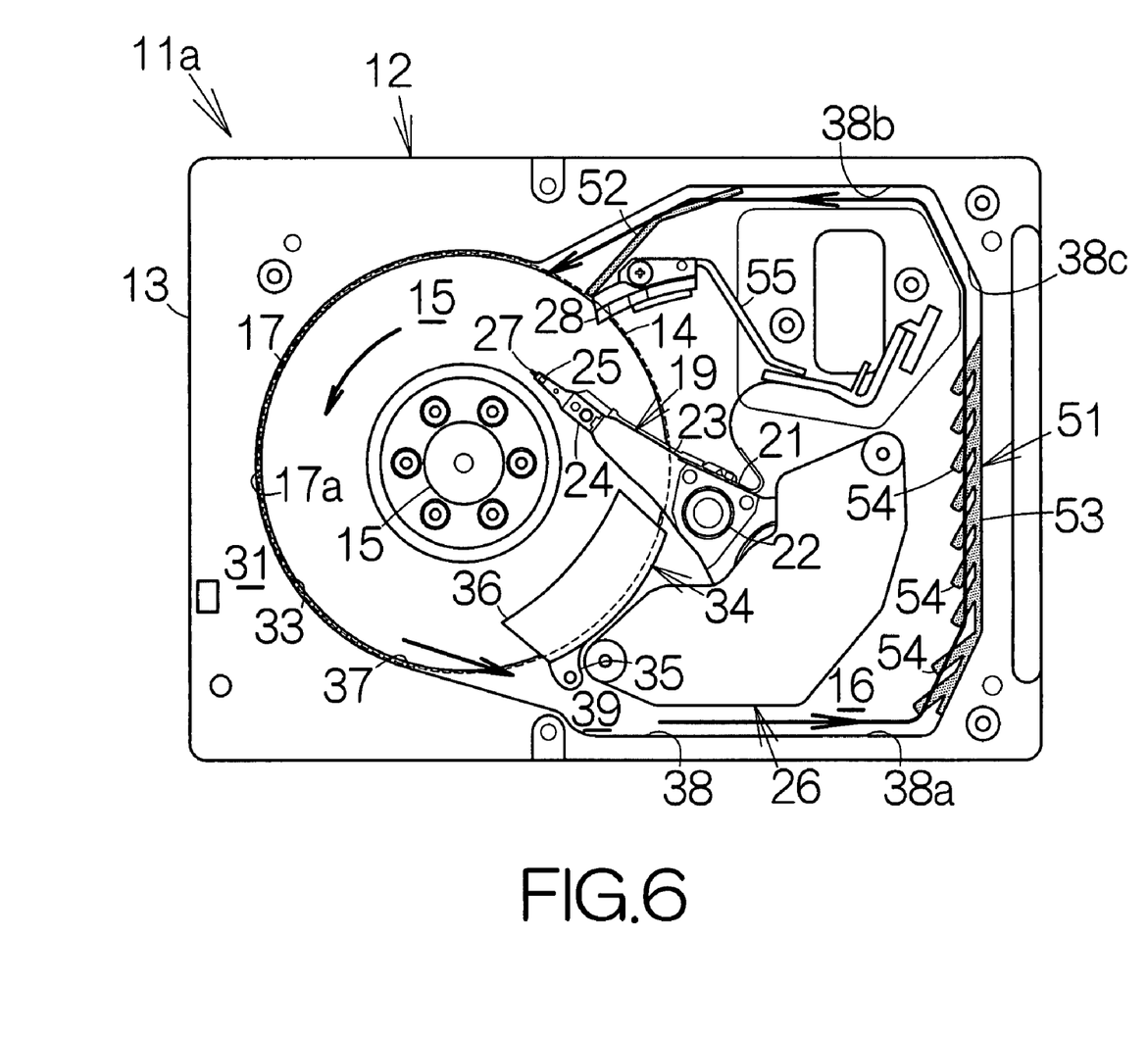
FIG. 6 is a plan view, corresponding to FIG. 1, schematically illustrating the inner structure of a hard disk drive according to a third embodiment of the present invention.

FIG. 6 schematically illustrates the inner structure of a hard disk drive 11a according to a third embodiment of the present invention. The hard disk drive 11a of this type is allowed to include third and fourth filters 51, 52 in the airflow passage 39 in place of the aforementioned first and second filters 43, 44. The third filter 51 is located along the airflow guide surface 38c. The third filter 51 includes a main body 53 attached to the third airflow guide surface 38c. Protrusions 54, 54, . . . are designed to protrude from the main body 53. The protrusions 54 may be integrated with the main body 53 so as to provide a one-piece member. The protrusions 54 extend along an imaginary plane intersecting the third airflow guide surface 38c at a predetermined cross angle. Here, the protrusions 54 may extend upstream from the downstream end fixed to the third airflow guide surface 38c.

The fourth filter 52 is located between the second airflow guide surface 38b and the ramp member 28. A guide wall 55 is connected to the ramp member 28. The guide wall 55 stands upright from the bottom plate of the base 13. The guide wall 55 may be integrated with the bottom plate of the base 13. The guide wall 55 gets closer to the second airflow guide surface 38b at positions nearer to the ramp member 28. The third and fourth filters 51, 52 may be made in the same manner as the aforementioned first and second filters 43, 44. Specifically, the third and fourth filters 51, 52 may be made of PTFE, electret, or the like. Like reference numerals are attached to structure or components equivalent to those of the aforementioned first and second embodiments.

The hard disk drive 11a allows airflow to flow along the third airflow guide surface 38c as described above. The third filter 51 is thus exposed to a sufficient amount of airflow, so that the third airflow guide surface 38c is allowed to sufficiently catch dust in the airflow. In addition, the protrusions 54 are terminated within the airflow passage 39. The protrusions 54 are thus allowed to suppress stay of airflow as much as possible. The third filter 51 is allowed to receive airflow of a sufficient current velocity. Moreover, since the protrusions 54 enable enlargement of area in the third filter 51 without increasing the occupied space. The third filter 51 is thus allowed to achieve an efficient catch of dust.

In addition, the guide wall 55 serves to prevent the airflow from leaking toward the head actuator member 19 out of the airflow passage 39. The air flow is thus allowed to enjoy a higher current velocity between the guide wall 55 and the second airflow guide surface 38b. The guide wall 55 contributes to establishment of an efficient inflow of airflow into the airflow passage 39 through the inflow opening 37. The fourth filter 52 is allowed to reliably receive airflow of a sufficient current velocity. The fourth filter 52 is thus allowed to enjoy an efficient catch dust out of the airflow.

What is claimed is:

1. A recording disk drive comprising:
    a recording disk configured to rotate around a rotation axis;
    a first shroud surface configured to extend along an imaginary cylinder defined coaxial to the recording disk, said first shroud surface opposed to an outward peripheral surface of the recording disk at a constant interval, said first shroud surface located upstream of a head actuator along a direction of rotation of the recording disk;
    a second shroud surface configured to extend along an imaginary cylinder defined coaxial to the recording disk, said second shroud surface opposed to the outward peripheral surface of the recording disk at a constant interval at a position downstream of the first shroud surface along a direction of rotation of the recording disk, said second shroud surface located upstream of a head actuator along a direction of rotation of the recording disk;
    an inflow opening defined between the first and second shroud surfaces;
    a rectifier plate configured to extend from the second shroud surface, said rectifier plate opposed to a surface of the recording disk at a certain interval;
    a shroud plate located within the inflow opening, said shroud plate opposed to the outward peripheral surface at a constant interval, said shroud plate extending along an imaginary plane perpendicular to the rotation axis of the recording disk; and
    a dust catcher located on an airflow passage extending from the inflow opening.

2. A recording disk drive comprising:
    a recording disk configured to rotate around a rotation axis;
    a shroud surface configured to extend along an imaginary cylinder defined coaxial to the recording disk, said shroud surface opposed to an outward peripheral surface of the recording disk at a constant interval;
    a head actuator configured to displace a head slider relative to the recording disk;
    an airflow guide surface configured to continuously extend from one end of the shroud surface and connected to an other end of the shroud surface, so as to define between the imaginary cylinder and the airflow guide surface itself a space for accommodating the head actuator; and
    a dust catcher defining protrusions protruding from the airflow guide surface.

3. A recording disk drive comprising:
    a recording disk rotating around a rotation axis;
    a shroud surface extending along an imaginary cylinder defined coaxial to the recording disk, said shroud surface opposed to an outward peripheral surface of the recording disk at a constant interval;
    a head actuator designed to displace a head slider relative to the recording disk;
    an airflow guide surface extending from an end to an end of the shroud surface so as to define between the imaginary cylinder and the airflow guide surface itself a space for accommodating the head actuator;
    an airflow passage defined along the airflow guide surface;
    a non-charged dust catcher located within the airflow passage, said non-charged dust catcher exposed to airflow of a first current velocity; and
    an electrostatic dust catcher located within the airflow passage, said electrostatic dust catcher exposed to airflow of a second current velocity smaller than the first current velocity.

4. The recording disk drive according to claim 1, wherein the dust catcher located near the inflow opening, the recording disk drive further comprising:
    an airflow guide surface configured to continuously extend from an end of the first shroud surface and connected to an other end of the first shroud, so as to define between the imaginary cylinder and the airflow guide surface itself the airflow passage along the airflow guide surface; and
    a further dust catcher located on the airflow passage at a position far from the inflow opening.

5. The recording disk drive according to claim 2, wherein said protrusions extend upstream, in a direction of airflow along the airflow guide surface, from downstream ends attached to the airflow guide surface, respectively.

6. The recording disk drive according to claim 3, wherein said non-charged dust catcher includes a fine mesh.

7. The recording disk drive according to claim 3, wherein said electrostatic dust catcher includes a mesh coarser than the fine mesh of the non-charged dust catcher.

* * * * *